United States Patent [19]

Moore, Jr.

[11] Patent Number: 4,888,369

[45] Date of Patent: Dec. 19, 1989

[54] POLYPROPYLENE COMPOSITION RESISTANT TO HIGH ENERGY RADIATION, AND RADIATION STERILIZED ARTICLES THEREFROM

[75] Inventor: Edward P. Moore, Jr., Wilmington, Del.

[73] Assignee: Himont Incorporated, Wilmington, Del.

[21] Appl. No.: 42,363

[22] Filed: Apr. 24, 1987

Related U.S. Application Data

[63] Continuation of Ser. No. 5,651, Jan. 21, 1987, abandoned, which is a continuation-in-part of Ser. No. 834,227, Feb. 27, 1986, abandoned, which is a continuation-in-part of Ser. No. 582,354, Feb. 22, 1984, abandoned, and a continuation of Ser. No. 823,526, Jan. 29, 1986, abandoned, which is a continuation-in-part of Ser. No. 582,353, Feb. 22, 1984, abandoned.

[51] Int. Cl.$^4$ .................... C08K 5/34; C08K 5/49; C08K 15/16
[52] U.S. Cl. .................... 524/100; 524/102; 524/120; 522/75; 522/76; 522/79; 523/105; 252/401; 252/403
[58] Field of Search .................... 524/100, 102, 120; 522/75, 76, 79; 523/105; 252/401, 403

[56] References Cited

U.S. PATENT DOCUMENTS

| | | | |
|---|---|---|---|
| 3,758,273 | 9/1973 | Johnston et al. | 522/157 |
| 3,905,939 | 9/1975 | Dexter et al. | 524/100 |
| 4,419,472 | 12/1983 | Berner et al. | 546/188 |
| 4,569,736 | 2/1986 | Kosegaki et al. | 524/101 |

FOREIGN PATENT DOCUMENTS

| | | |
|---|---|---|
| 0007736 | 2/1988 | European Pat. Off. |
| 894327 | 9/1982 | France |
| 1490938 | 11/1977 | United Kingdom |

*Primary Examiner*—John Kight
*Assistant Examiner*—Kriellion Morgan

[57] ABSTRACT

Disclosed is a high energy radiation resistant, polypropylene composition. It consists essentially of substantially crystalline normally solid polypropylene having a narrow molecular weight distribution, and, dispersed therein at a concentration effective to increase substantially the high energy radiation resistance of the polypropylene, a synergistic mixture of:

(1) a hindered amine component,
(2) a hindered phenolic component, and
(3) a phosphorous containing component, the weight ratios of component (1) to component (2) to component (3) being about 1:(0.1–2):(0.1–2).

Also disclosed are radiation sterilized articles in which at least part of the material of construction comprises the polypropylene composition.

5 Claims, No Drawings

POLYPROPYLENE COMPOSITION RESISTANT TO HIGH ENERGY RADIATION, AND RADIATION STERILIZED ARTICLES THEREFROM

The application is a continuation of U.S. patent application, Ser. No. 5,651, filed Jan. 21, 1987 now abandoned, of same title, which is a continuation-in-part of U.S. patent application, Ser. No. 834,227, filed Feb. 27, 1986 now abandoned, of same title, which is a continuation-in-part of the U.S. patent application, Ser. No. 582,354, filed Feb. 22, 1984, of the same title, now abandoned, and a continuation of U.S. patent application, Ser. No. 823,526, filed Jan. 29, 1986 now abandoned, entitled High Energy Radiation Resistant Polypropylene Composition And Radiation Sterilized Articles Thereof, which is a continuation-in-part of U.S. patent application, Ser. No. 582,353, filed Feb. 22, 1984, of same title, now abandoned.

FIELD OF INVENTION

This invention resides in the chemical arts. More particularly, it relates to the inhibition of degradation of synthetic resins.

BACKGROUND OF INVENTION

The U.S. Pat. Nos. 4,110,185 and 4,274,932, to Williams et al., the relevant disclosures of which are incorporated herein by reference, disclose the use of substantially crystalline polypropylene as a material of construction for radiation sterilizable articles such as syringes, tube assemblies, tissue culture flasks, packaging film, and the like. However, when polypropylene is subjected to high energy radiation such as, for example, gamma rays (from cobalt 60), high energy electrons and x-rays, to sterilize articles made therefrom, the material tends to degrade. The two patents not only disclose this problem, but propose solutions to it. The first patent teaches the use of an additive termed a mobilizer, such as a hydrocarbon oil, while the second patent teaches in addition to the mobilizer, the use of polypropylene which has been treated to give it a narrow molecular weight distribution. Application of these teachings of the two patents does inhibit the onset of embrittlement of high energy radiated polypropylene, but further improvement is needed.

This invention provides such improvement.

SUMMARY OF INVENTION

In summary, this invention comprises a polypropylene composition comprising highly crystalline polypropylene of narrow molecular weight distribution, and, dispersed therein at a concentration effective to increase substantially the high energy radiation resistance of said polypropylene, a synergistic mixture of:

(1) a hindered amine component having the general formula:

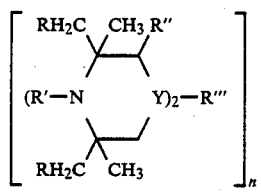

wherein n is 1 to 20, R is H or $CH_3$, R' is H, $CH_3$ or $CH_2CH_3$, R'' is

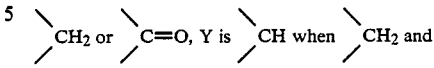

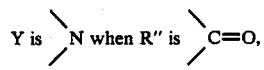

and R''' is a divalent radical which is (a) a dicarboxyl substituted alkylene derived from an aliphatic dicarboxylic acid having 3–20 carbon atoms; a dicarboxyl substituted alkylene derived from an aliphatic dicarboxylic acid having 3–6 carbon atoms which is substituted with a $C_{1-5}$ straight or branched alkyl, a substituted benzyl or a $C_{1-5}$ straight or branched alkyl and a substituted benzyl when n is 1 and Y is

(b) an alkylene having 1–4 carbon atoms when n is 1 and Y is

and (c) a radical of the formula:

wherein the nitrogens are bonded to Y of the piperidyl rings, $R^4$ is a substituted triazine which is bonded by a carbon to nitrogen bond between the adjacent nitrogen atoms and the 2,6-carbon atoms of the triazine ring and $R^5$ is an alkylene having 1–10 carbon atoms when n is 2–20 and Y is

(2) a hindered phenolic component selected from the group consisting of 1,3,5-tris(3,5-di-t-butyl-4-hydroxy-benzyl)-s-triazine, tetrakis[methylene 3-(3',5'-di-t-butyl-4'-hydroxyphenyl)propionate] methane, 1,3,5-tris-(4-t-butyl-3-hydroxy-2,6-dimethylbenzyl)-1,3,5-triazine-2,4,6(1H, 3H, 5H)trione, and 3,5-di-t-butyl-4-hydroxycinnamic acid triester with 1,3,5-tris-(2-hydroxyethyl)-s-double bond-triazine-2,4,6(1H, 3H, 5H)trione, and (3) a phosphorous containing component selected from the group consisting of tetrakis(2,4-di-t-butylphenyl)4,4'-biphenylylene diphosphonite, tris(2,4-di-t-butylphenyl)-phosphite, trisnonylphenyl phosphite, bis(2,4-di-t-butylphenyl)pentaerythritol diphosphite, bis(distearyl)pentaerythritol diphosphite, and bis(distearyl)pentaerythritol diphosphite with one percent (1%) triethanolamine, the weight ratios of component (1) to component (2) to component (3) being about 1:(0.1-2):(0.1-2).

Typical dicarboxyl substituted alkylenes includes methylene, ethylene, propylene, butylene, pentylene, hexylene, heptylene, octylene, Octylene is the preferred dicarboxyl substituted alkylene when the alkylene is unsubstituted and methylene when the alkylene is substituted.

Suitable $C_{1-5}$ straight or branched chain alkyls include methyl, ethyl, propyl, butyl, isobutyl, and pentyl. Butyl is the preferred alkyl.

The substituted benzyl is substituted with one or more straight or branched $C_{1-4}$ alkyl, hydroxyl or combinations thereof, preferably with a hydroxyl in the para position and with a t-butyl in each of the meta positions.

When n is 0 and Y is

ethylene is the preferred alkylene.

Preferably n is 1-7.

The substituted triazine, $R^4$, is substituted with morpholinyl group bonded to the triazine by a carbon to nitrogen bond between the nitrogen of the mopholinyl group and a carbon of the triazine ring, or a substituted amine of the formula —$NR^6$ wherein $R^6$ is $C_{1-10}$ straight or branched alkyl. Typical alkyl groups include methyl, ethyl, propyl, isopropyl, butyl, isobutyl, pentyl, isopentyl, hexyl, octyl and 1,1,3,3-tetramethylbutyl. Preferably the triazine is substituted with morpholinyl or a substituted amine wherein the substitution is 1,1,3,3-tetramethylbutyl.

$R^5$ is preferably an alkylene having 8 carbon atoms.

Substantially crystalline normally solid polypropylene is the well-known polypropylene of commerce. It has a x-ray defraction crystallinity of 20-90%. Polypropylene of narrow molecular weight distribution also is well-known. It can be made by treating ("visbreaking") by any of the methods disclosed in the U.S. Pat. No. 4,282,076, to Boynton, substantially crystalline, normally solid polypropylene haviing substantially the molecuar weight distribution as when it was formed.

The components of the synergistic mixture are known.

The concentration of the synergistic mixture in the composition can vary, depending on the desired results. However, in general a concentration of about 0.18-0.23 parts by weight per 100 parts by weight of the polypropylene gives satisfactory results.

The composition of this invention, in addition to the synergistic mixtyure, can comprise other additives. Examples of such additives include acid neutralizers, nucleating agents, fillers, mobilizers, property improvers, colorants and the like.

The composition is made by conventional ways and means for making polypropylene compositions. For example, the composition is made by admixing the components in finely divided condition, by melt compounding, and the like. The composition also can be made by admixing the stabilizer mixture with finely divided, substantially crystalline, normally solid polypropylene, the molecular weight distribution of which is as-formed, and then treating the mixture with an organic peroxide to convert the polypropylene to one of narrow molecular weight distribution.

The composition is used by converting it into useful articles, such as, for example, syringe bodies, tissue culture tubes, packaging films, fibers for surgical gowns, sheets and the like. Thereafter, the articles are subjected to high energy radiation to sterilize the articles and material contained therein. A radiation dosage of 2.5 megarads is sufficient to effectively sterilize shaped articles and the material contained therein and is the industry standard. However, radiation dosages from about 2.5 to about 5.0 megarads can be applied even though radiation dosages in excess of 2.5 megarads are not necessary to accomplish the sterilization.

The best mode now contemplated of carrying out the invention is illustrated by the following examples of preferred embodiments of the composition of this invention. In these examples the quantities of the components are in parts per hundred (pph) parts of the polypropylene component.

EXAMPLES 1-17

These examples illustrate preferred embodiments of the polypropylene composition of this invention.

The formulations of these embodiments are set forth in Table I below.

TABLE I

| Components | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| NMWD Polypropylene | 100 | 100 | 100 | 100 | 100 | 100 | 100 | 100 | 100 | 100 | 100 | 100 | 100 | 100 | 100 | 100 | 100 |
| Calcium sterate | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Bis(2,2,6,6-tetramethyl-4-piperidyl)sebacate | 0.1 | 0.1 | — | — | 0.1 | — | — | — | 0.1 | 0.1 | 0.1 | 0.1 | 0.1 | 0.1 | — | — | — |
| Di(1,2,2,6,6-pentamethyl-4-peridyl)-2-n-butyl-2(3,5-di-t-butyl-4-hydroxybenzyl)-malonate | — | — | 0.1 | 0.1 | — | 0.1 | — | — | — | — | — | — | — | — | — | — | — |
| Bis(2,2,6,6-tetramethyl-4-n-methylpiperidyl)sebacate | — | — | — | — | — | — | 0.1 | — | — | — | — | — | — | — | 0.1 | 0.1 | 0.1 |
| N,N'—bis(2,2,6,6-tetramethyl-4-piperidyl)-1,6-hexane-diamine, polymer with 2,4,6-trichloro-1,3,5-triazine and 2,4,4-trimethyl-1,2-petanamine | — | — | — | — | — | — | — | 0.1 | — | — | — | — | — | — | — | — | — |
| 1,3,5-Tris(3,5-di-t-butyl-4-hydroxybenzyl)-s-triazine | 0.03 | — | 0.03 | 0.03 | 0.03 | 0.03 | 0.03 | 0.03 | 0.03 | — | — | — | — | — | — | — | — |
| 3,5-di-t-butyl-4-hydroxy-cinnamic acid triester with 1,3,5-tri(2-hydroxyethyl)-s-double bond-triazine-2,4,6(1H, 3H, 5H)trione | — | — | — | — | — | — | — | — | — | 0.03 | — | 0.03 | — | 0.03 | 0.03 | — | — |
| 1,3,5-tris(4-t-butyl-3-hydroxy-2,6-dimethylbenzyl)-1,3,5-triazine-2,4,6(1H, 3H, 5H)—trione | — | — | — | — | — | — | — | — | — | — | 0.03 | — | 0.03 | — | — | 0.03 | 0.03 |
| Tetrakis[methylene 3-(3',5'-di-t-butyl-4'-hydroxyphenyl)propionate] methane | — | 0.03 | — | — | — | — | — | — | — | — | — | — | — | — | — | — | — |
| Tris(2,4-di-t-butylphenyl)-phosphite | — | 0.1 | 0.1 | 0.05 | 0.1 | 0.1 | 0.1 | 0.01 | 0.05 | 0.05 | 0.05 | — | — | — | — | — | — |
| Bis(2,4-di-t-butylphenyl)-pentaerythritol diphosphite | — | — | — | — | — | — | — | — | — | — | — | 0.05 | 0.03 | — | — | — | — |
| Tetrakis(2,4-di-t-butyl-phenyl)-4,4'-biphenyly-lene diphosphonite | 0.1 | — | — | — | — | — | — | — | — | — | — | — | — | 0.1 | 0.1 | 0.1 | 0.1 |

The NMWD polypropylene component is a substantially crystalline normally solid polypropylene, the molecular weight distribution of which has been narrowed from that of the polymer as formed. It has a melt flow rate (ASTM D 1238L; $I_2$ at 230° C.) of 10–14 in Examples 1–4 and a melt flow rate of 12–14 in Examples 5–17. It is made by "visbreaking" a substantially crystalline, normally solid polypropylene that has the as-formed molecular weight distribution, and a nominal melt flow rate (ASTM D 1238L; $I_2$ at 230° C.) of 0.4.

Calcium stearate is well-known and commercially available. It is present to neutralize any acidity in the polypropylene component.

The first mentioned piperidyl sebacate is commercially available as Tinuvin 770.

The piperidyl malonate is commercially available as Tinuvin 144.

The second mentioned piperidyl sebacate is commercially available as Tinuvin 765.

The polymer prepared from the diamine, triazine and petanamine is commercially available as Chimassorb 944LD.

The triazine is commercially available as Goodrite 3114.

The cinnamic acid ester with the trione is commercially available as Goodrite 3125.

The trione is commercially available as Cyanox 1790.

The methane is commercially available as Irganox 1010.

The phosphite is commercially available as Irgafos 168.

The diphosphite is commercially available as Weston 626.

The diphosphonite is also commercially available.

The compositions of these formulations are made by admixing the components in finely divided condition with 2,5-dimethyl-2,5-di(t-butyl peroxy)hexane at a concentration of 0.05–0.07 parts per 100 parts of the polypropylene, and then melt extruding the resulting mixtures into pellets and the like. They also are made as indicated below.

The compositions of these formulations are used by forming them by conventional ways and means into articles or parts of ultimate articles to be subjected to high energy radiation. Examples of articles include syringe bodies, film for packaging medical supplies, culture tubes, and the like, which are sterilized by sterilizing amounts of high energy radiation.

Typical data obtained in the radiation testing, not necessarily at the same time, of samples of specific embodiments of Examples 1, 2, 3, 4, 5 and 9 of this invention, and samples of polypropylene compositions having less than all of the components of the formulations of Examples 1, 2, 3, 4, 5 and 9, are set forth Table II below. The ingredients from which each sample was made are identified in Table II with the numbers in the sample number columns indicating the quantities of the ingredients in each sample in pph of the polypropylene ingredient. Each of the samples were made by admixing the ingredients thereof, which were in finely divided condition, melt compounding, and then melt extruding the resulting blends into 40 mil sheets. The polypropylene ingredient was a substantially crystalline, normally solid polypropylene, the molecular weight distribution of which was substantially as-formed, and having a nominal melt flow (ASTM D 1238L; $I_2$ at 230° C.) of 0.4. During the melt compounding, because of the presence of the peroxy compound, the polypropylene ingredient was visbroken to a substantially crystalline, normally solid polypropylene of narrow molecular weight distribution. The sheets prepared from the formulations of Examples 1–4 were exposed to 5 megarads of cobalt 60 gamma radiation. The irradiated sheets were aged at 60° C., and tested for Gardner impact strength at regular intervals until failure. Typical impact strength of a non-irradiated sample was 30–35 inch pounds. Failure was deemed to have occurred when an impact strength of less than 10 inch pounds was measured.

TABLE II

| Ingredients | 1 | 2 | 3 | 4 | 5 | 9 | 18 | 19 | 20 | 21 | 22 | 23 | 24 | 25 | 26 |
|---|---|---|---|---|---|---|---|---|---|---|---|---|---|---|---|
| Polypropylene with as-formed MWD | 100 | → | → | → | → | → | → | → | → | → | → | → | → | → | → |
| 2,5-Dimethyl-2,5-di(t-butyl peroxy)hexane | 0.05–0.07 | → | → | → | → | → | → | → | → | → | → | → | → | → | → |
| Calcium stearate | 0.1 | → | → | → | → | → | → | → | → | → | → | → | → | → | → |
| Bis(2,2,6,6-tetramethyl-4-piperidyl)-sebacate | 0.1 | 0.1 | — | — | 0.1 | 0.1 | 0.1 | 0.1 | — | — | — | — | 0.1 | 0.1 | — |
| Di(1,2,2,6,6-pentamethyl-4-peridyl)-2-n-butyl-2(3,5-di-t-butyl-4-hydroxybenzyl)malonate | — | — | 0.1 | 0.1 | — | — | — | — | 0.1 | 0.1 | — | — | — | — | — |
| 1,3,5-Tris(3,5-di-t-butyl-4-hydroxybenzyl)-s-triazine | 0.03 | — | 0.03 | 0.03 | 0.03 | 0.03 | — | — | — | — | 0.03 | 0.03 | — | 0.03 | — |
| Tetrakis[methylene 3-(3′,5′-di-t-butyl-4′-hydroxyphenyl)-propionate] methane | — | 0.03 | — | — | — | — | — | — | — | — | — | — | — | — | — |
| Tris(2,4-di-t-butylphenyl)phosphite | — | 0.1 | 0.1 | 0.05 | 0.1 | 0.05 | — | 0.05 | — | 0.05 | — | 0.1 | 0.1 | — | 0.1 |
| Tetrakis(2,4-di-t-butyl-phenyl)-4,-4′-biphenylylene diphosphonite | 0.1 | — | — | — | — | — | — | — | — | — | — | — | — | — | — |
| Weeks to failure | 25 | 27 | 30 | >28 | 23 | 21 | 3, 4 | 4 | 4 | 4 | 1 | 1, 4 | 3 | 7 | 1 |

As can be seen, the times to failure of samples 1, 2, 3, 4, 5 and 9 (corresponding to the compositions of Examples 1, 2, 3, 4, 5 and 9) are far greater than the times to failure of the other samples (corresponding to samples 18-26) having less than all of the components of the formulations of Examples 1, 2, 3, 4, 5, and 9. Indeed, the data suggest the presence of synergism in the samples 1, 2, 3, 4, 5 and 9.

Typical data obtained in another series of radiation testing, not necessarily at the same time, of samples of specific embodiments of Examples 5-17 of this invention are set forth in Table III, and of samples of polypropylene compositions having less than all of the components of the formulations of Examples 5-17 are set forth in Table IV below. The ingredients from which each sample was made are identified in Table I for Examples 5-17 and are identified in Table IV for the sample of polypropylene compositions having less than all of the components of the formulations of Examples 5-17 together with the quantities of the ingredients in each sample in pph of the polypropylene ingredient. Each of the samples were made by admixing the ingredients thereof, which were in finely divided condition, melt compounding, and then melt extruding the resulting blends into 40 mil sheets. The polypropylene ingredient was a substantially crystalline, normally solid polypropylene, the molecular weight distribution of which was substantially as-formed, and having a nominal melt flow (ASTM D 1238L; $I_2$ at 230° C.) of 0.4. During the melt compounding, because of the presence of the peroxy compound, the polypropylene ingredient was visbroken to a substantially crystalline, normally solid polypropylene of narrow molecular weight distribution. The sheets prepared from the formulations of Example 5-17 and of the samples of polypropylene compositions having less than all of the components of the formulations of Examples 5-17 were exposed to 3 and to 5 megarads of cobalt 60 gamma radiation. The irradiated sheets were aged at 60° C., and tested for Gardner impact strength at regular intervals until failure. Typical impact strength of a non-irradiated sample was 30-35 inch pounds. Failure was deemed to have occured when an impact stength of less than 2 inch pounds was measured in two successive impacts.

TABLE III

| Dose Megarads | Days to Failure Example No. | | | | | | | | | | | | |
|---|---|---|---|---|---|---|---|---|---|---|---|---|---|
| | 5 | 6 | 7 | 8 | 9 | 10 | 11 | 12 | 13 | 14 | 15 | 16 | 17 |
| 3 | 545 | 545 | 619 | 501 | 797 | 797 | 797 | 797 | 797 | 684 | 684 | 684 | 585 |
| 5 | 22 | 89 | 43 | 5 | 38 | 55 | 66 | 56 | 6 | 12 | 65 | 28 | 15 |

TABLE IV

| Components | Sample No. | | | | | | | | | | | | | |
|---|---|---|---|---|---|---|---|---|---|---|---|---|---|---|
| | 27 | 28 | 29 | 30 | 31 | 32 | 33 | 34 | 35 | 36 | 37 | 38 | 39 | 40 |
| NMWD Polypropylene | 100 | → | → | → | → | → | → | → | → | → | → | → | → | → |
| 2,5-Dimethyl-2,5-di(t-butyl peroxy)hexane | 0.05–0.07 | → | → | → | → | → | → | → | → | → | → | → | → | → |
| Calcium stearate | 0.1 | → | → | → | → | → | → | → | → | → | → | → | → | → |
| Bis(2,2,6,6-tetramethyl-4-piperidyl)sebacate | — | — | 0.1 | — | — | — | 0.1 | — | — | — | — | — | — | 0.1 |
| Di(1,2,2,6,6-pentamethyl-4-peridyl)-2-n-butyl-2(3,5-di-t-butyl-4-hydroxybenzyl)-malonate | — | — | — | — | — | — | — | — | — | — | — | — | — | — |
| Bis(2,2,6,6-tetramethyl-4-n-methylpiperidyl)sebacate | 0.1 | — | — | — | — | — | — | — | — | — | — | — | — | — |
| N,N'—bis(2,2,6,6-tetramethyl-4-piperidyl)-1,6-hexanediamine, polymer with 2,4,6-trichloro-1,3,5-triazine and 2,4,4-trimethyl-1,2-petanamine | — | 0.1 | — | — | — | — | — | — | — | — | — | — | — | — |
| 1,3,5-Tris(3,5-di-t-butyl-4-hydroxybenzyl)-s-triazine | — | — | — | — | — | 0.03 | — | — | 0.03 | — | — | — | — | 0.03 |
| 3,5-di-t-butyl-4-hydroxy-cinnamic acid triester with 1,3,5-tris(2-hydroxyethyl)-s-double bond-triazine-2,4,6(1H, 3H, 5H)trione | — | — | — | — | — | — | — | — | — | — | — | — | 0.1 | — |
| 1,3,5-tris(4-t-butyl-3-hydroxy-2,6-dimethylbenzyl)-1,3,5-triazine-2,4,6(1H, 3H, 5H)-trione | — | — | — | — | — | — | — | 0.05 | — | — | — | 0.05 | — | — |
| Tetrakis[methylene 3-(3', 5'-di-t-butyl-4'-hydroxyphenyl)propionate] methane | — | — | — | — | 0.05 | — | — | — | — | — | — | — | — | — |
| Tris(2,4-di-t-butylphenyl)-phosphite | — | — | — | — | — | — | — | — | 0.1 | 0.1 | — | — | — | — |
| Bis(2,4-di-t-butylphenyl)-pentaerythritol disphosphite | — | — | 0.03 | — | — | — | — | — | — | — | — | — | — | — |
| Tetrakis(2,4-di-t-butyl-phenyl)-4,-4'-biphenylylene diphosphonite | — | — | — | — | — | — | — | — | 0.1 | 0.1 | — | — | — | — |
| Dose Megarads | Days to Failure | | | | | | | | | | | | | |
| 3 | 530 | 101 | 371 | 71 | 210 | 8 | 275 | 5 | 55 | 43 | 29 | 109 | 0 | 105 |
| 5 | 54 | 5 | 31 | 11 | 0 | 0 | 12 | 0 | 3 | 2 | 12 | 1 | 0 | 5 |

As can be seen, the times to failure of Examples 5-17 are far greater than the times to failure of samples 27-40 at a radiation dosage sufficient to effectively sterilize shaped articles and the material contained therein. Indeed, the data suggest the presence of synergism in the Examples 5-17.

Thus, this invention provides a polypropylene composition having a featyure of enhanced resistance to degradation by high energy radiation.

Other features, advantages and embodiments of the invention disclosed herein will be readily apparent to those exercising oridinary skill after reading the foregoing disclosures. In this regard, while specific embodiments of the invention have been described in considerable detail, variations and modifications of these embodiments can be effected without departing from the spirit and scope of the invention as described and claimed.

The expression "consisting essentially of" as used in this specification excludes any unrecited substance at a concentration sufficient to substantially adversely affect the essential properties and characteristics of the compositions of matter being defined while permitting the presense of one or more unrecited substances at concentrations insufficient to substantially adversely affect said essential properties and characteristics.

I claim:

1. A composition useful for inhibiting high energy radiation degradation of polypropylene, which comprises a mixture consisting essentially of (a) bis(2,2,-6,6-tetramethyl-4-piperidyl)sebacate, (b) 1,3,5-tris(3,5-di-t-butyl-4-hydroxybenzyl)-s-triazine, and (c) tris(2,4-di-t-butylphenyl) phosphite the weight ratios of the component (a) to the component (b) to the component (c) being about 1:(0.1-2):(0.1-2).

2. A high energy radiation degradation inhibited polypropylene composition consisting essentially of substantially crystalline, normally solid polypropylene of narrow molecular weight distribution, and, dispersed therein at a concentration effective to substantially inhibit high energy radiation degradation of said polypropylene, a synergistic mixture of (a) bis(2,2,-6,6-tetramethyl-4-piperidyl)sebacate, (b) 1,3,5-tris(3,5-di-t-butyl-4-hydroxybenzyl)-s-triazine, and (c) tris(2,4-di-t-butyl-phenyl) phosphite the weight ratios of the component (a) to the component (b) to the component (c) being about 1:(0.1-2):(0.1-2).

3. The composition according to claim 2 in which said concentration is about 0.18-0.23 parts by weight per 100 parts by weight of the polypropylene.

4. A high energy radiation sterilizable article in which at least part of the material of construction thereof comprises the composition of claim 2.

5. A high energy radiation sterilized article in which at least part of the material of construction thereof comprises the composition of claim 2.

* * * * *

UNITED STATES PATENT AND TRADEMARK OFFICE
CERTIFICATE OF CORRECTION

PATENT NO.  : 4,888,369

DATED       : December 19, 1989

INVENTOR(S) : Edward P. Moore, Jr.

It is certified that error appears in the above-identified patent and that said Letters Patent is hereby corrected as shown below:

Column 2, line 6, after "when" insert --R'' is--.

Table I, line 21, change "1,3,5-tri" to read --1,3,5-tris--.

Signed and Sealed this

Fifteenth Day of January, 1991

*Attest:*

HARRY F. MANBECK, JR.

*Attesting Officer*     *Commissioner of Patents and Trademarks*